Patented Nov. 23, 1937

2,099,781

UNITED STATES PATENT OFFICE 2,099,781

HALOGENATION PROCESS AND PRODUCT

William Robert Waldron, Wilmington, Del., assignor to E. I. du Pont de Nemours & Company, Wilmington, Del., a corporation of Delaware No Drawing. Application October 27, 1933, Serial No. 695,547

2 Claims. (Cl. 23—205)

This invention relates to halogen compounds, more particularly phosphorus halides and the reaction products of phosphorus pentahalides with hydroxy compounds, and a process for the production thereof.

It is known that phosphorus halides, such as phosphorus pentachloride, react with hydroxy compounds according to the following general equation:

I. 

in which R represents an organic group, radical, residue or nucleus, or an inorganic element or radical. Thus, when R represents hydrogen, the equation is as follows:

II. 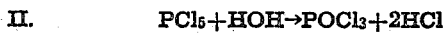

When R represents an alkyl group, as for example, methyl, ethyl, propyl, butyl and higher alkyl radicals, the corresponding alkyl chlorides are produced. When R represents an aryl group, such as phenyl, naphthyl or other aryl nuclei, the corresponding aryl chlorides are produced. When R represents an acyl group, as for example, $CH_3CO$, $C_2H_5CO$ or $C_6H_5CO$, the product is an acyl chloride. Other acid chlorides may similarly be produced, as for example, organic sulfone chlorides from the corresponding sulfonic acids, and thionyl chloride from sulfur dioxide. The preparation of compounds of the character above described is rendered difficult on account of the fact that the production and handling of phosphorus pentachloride is accompanied by many difficulties and hazards.

It is an object of the present invention to provide a new and improved process for the production of phosphorus halides, and the reaction products of phosphorus pentahalides with hydroxy compounds. Another object is the provision of a new and improved process for the production of phosphorus pentachloride and the reaction products of phosphorus pentachloride with hydroxy compounds. A further object is the production of compositions which are readily adapted to the halogenation of hydroxy compounds to replace the hydroxyl group by a halogen atom and which may be handled with many advantages over present methods of preparing and handling phosphorus halides such as phosphorus pentachloride. A still further object is the preparation of phosphorus pentachloride in a much higher state of purity, less contaminated with decomposition products than phosphorus pentachloride at present obtainable commercially. Other objects will appear hereinafter.

In accomplishing these objects according to the present invention, it has been found that phosphorus pentahalides, such as phosphorus pentachloride, may be produced by a reaction which proceeds readily and smoothly by reacting a halogen such as chlorine with a phosphorus trihalide such as phosphorus trichloride, in the presence of an organic solvent which is substantially inert under the conditions of reaction. Further, it has been found that the reaction may also be effected with phosphorus instead of the phosphorus trihalide, although more satisfactory results are obtained with the phosphorus trihalide.

The halogenation may be effected so that the halogenation product is substantially a mixture of the phosphorus pentahalide with the organic solvent, with a moderate percentage of the phosphorus pentachloride actually dissolved, or in many cases, for the subsequent application of this reaction mixture, it is desirable that the phosphorus trihalide also be present. The resultant halogenation mixture is especially suitable for reaction with hydroxy compounds, such as, for example, those of the type previously described, and particularly organic carboxylic acids and alcohols, to produce a phosphorus oxyhalide and compounds corresponding to the hydroxy compounds but having the hydroxyl group replaced by a halogen atom. Instead of reacting the hydroxy compound after the formation of the halogenation mixture, the hydroxy compound may be present during the halogenation, thereby effecting the production of the phosphorus pentahalide and its reaction with the hydroxy compound practically simultaneously.

The invention will be further understood, but is not limited, by the following examples, in which the parts are by weight.

Example I

To a mixture of 790 parts of nitrobenzene and 105 parts of phosphorus trichloride, add 51.2 parts of chlorine at a temperature of about 35° C. or lower. The amount of chlorine may be determined by weighing the chlorine, by the increase in weight of the mixture or by an analysis to determine the amount of unchlorinated phosphorus trichloride. This amount of chlorine should form the pentachloride, leaving 8.6 parts excess of phosphorus trichloride. After determinations have been made to check the amount of phosphorus pentachloride formed, this mixture is suitable for use in forming the acid chloride of an organic acid. For example, on introducing 1:9-isoanthrathiazol-2-carboxylic acid in proportions corresponding to 175 parts into the above mixture and maintaining a temperature of about 80° C. for one hour, 1:9-isoanthrathiazol-2-carbonyl-chloride is formed in almost theoretical amount.

Example II

To a mixture of 790 parts of ortho-dichlorobenzene and 105 parts of phosphorus trichloride add 54.3 parts of chlorine at a temperature below 35° C. The phosphorus pentachloride is formed in the same way as in Example I, but the increased amount of chlorine converts all of the trichloride to pentachloride. The pentachloride, which is partly dissolved in the solvent at this temperature, may be used in the acid chloride formation as in Example I.

Example III

To a mixture of 790 parts of ortho-dichlorobenzene, 105 parts of phosphorus trichloride and 175 parts of 1:9-isoanthrathiazol-2-carboxylic acid, add 54.3 parts of chlorine at a temperature of about 45° C. and then heat the resultant mixture for one hour at 80° C. A very good yield of 1:9-isoanthrathiazol-2-carbonyl-chloride is obtained.

The halogenation may be carried out in the presence of other organic solvents such as, for example, benzene, solvent naphtha or carbon tetrachloride. The choice of solvent may be made on the basis of the type of hydroxy compound to be halogenated by reaction with the phosphorus pentahalide. Thus, by choosing the proper solvent, some acid chlorides which are too soluble in one solvent to be isolated by filtration may be separated in this way by using another solvent in which the acid chloride has a lower solubility. This choice of solvent also applies to halogen compounds which may be isolated by distillation. By having the boiling point of the solvent and the desired halogen compound as far apart as possible the separation is simplified. This likewise applies to the phosphorus oxychloride when it is desired to recover it. Thus, in Equation I, supra, where R is an organic radical and the product is an organic chloride only slightly soluble in the reaction solvent, phosphorus oxychloride may be removed from the solvent filtrate.

Removal of the phosphorus oxychloride from the filtrate may be effected by distillation at atmospheric or reduced pressure. In the case where the organic chloride is very soluble, phosphorus oxychloride may be removed by distillation, leaving the acid chloride in the organic solvent.

As previously indicated, the reaction may also be carried out starting with elemental phosphorus. In the case where yellow phosphorus is used, the solubility in many solvents is rather low and the chlorine combining with undissolved phosphorus is rather violent. Consequently, there may be a certain amount of carbonization of the solvent. However, phosphorus pentachloride may be obtained in good yields in this way, though contaminated with carbon. This reaction also takes place with red phosphorus, but much more slowly. It is preferable to start with phosphorus trichloride, prepared in the usual way, dissolving it in the solvent and chlorinating it to the pentachloride.

It will be recognized that the halogenation reaction is of such a nature that bromine may be used in place of chlorine to produce phosphorus pentabromide. Also, that mixtures of chlorine and bromine may be used to produce a mixed phosphorus pentahalide such as, for example, $PCl_3Br_2$.

The invention is generally applicable to the halogenation of hydroxy compounds, as described in connection with Equation I. As specific examples of compounds which may be halogenated may be mentioned: water to phosphorus oxychloride; para-nitrobenzoic acid to para-nitrobenzoyl chloride; acetic acid to acetyl chloride; ethyl alcohol to ethyl chloride; methyl alcohol to methyl chloride; benzoic acid to benzoyl chloride; ortho-chlor-benzoic acid to ortho-chlor-benzoyl chloride; benzyl alcohol to benzyl chloride; propyl alcohol to propyl chloride; isopropyl alcohol to isopropyl chloride; butyl alcohol to butyl chloride; phenol to chlorbenzene; benzene-sulfonic acid to benzene-sulfone chloride; ethylene glycol to ethylene dichloride; 1-chlor-2-carboxy-anthraquinone to 1-chlor-anthraquinone - 2 - carbonyl-chloride; alpha-anthraquinone-carboxylic acid to alpha-anthraquinone-carbonyl-chloride; 1-hydroxy-anthraquinone to 1-chlor-anthraquinone; beta-anthraquinone-carboxylic acid to beta-anthraquinone-carbonyl-chloride; 1:2-dihydroxy-anthraquinone to 1:2-dichlor-anthraquinone; naphthalene-carboxylic acids to naphthoyl chlorides; other benzoic acids to the corresponding benzoyl chlorides, and other anthraquinone-carboxylic acids to the corresponding acid chlorides.

In practising the invention, the amount of solvent may be varied within relatively wide limits, preferably being sufficient, however, to dissolve the phosphorus trihalide. The temperature of halogenation is also subject to variation, although in carrying out chlorination reactions temperatures below about 45° C. are preferably employed. At higher temperatures, there is a tendency to chlorinate the solvent and, also, at higher temperatures the phosphorus pentachloride tends to dissociate, giving phosphorus trichloride and chlorine.

The presence of iron or nickel has little, if any, catalytic effect on the chlorination. As a result of this, the reaction may be carried out in an enamel-lined vessel, using a nickel pipe for the introduction of chlorine. On chlorinating the phosphorus trichloride diluted with a solvent, no stoppage of the chlorine line occurs. This always takes place when pure phosphorus trichloride is chlorinated to the pentachloride.

The invention offers a new method of preparing a phosphorus pentahalide, such as phosphorus pentachloride, since it may be isolated as a solid from the organic solvent. This may be done by cooling, decreasing the amount of solvent, or by the choice of solvents to obtain one in which the solubility is low. Phosphorus oxychloride obtained as a product of the reaction of the phosphorus pentachloride with the hydroxy compound is a valuable condensing agent.

Phosphorus pentachloride, as purchased, is very difficult to store and ship. It is usually shipped in stone-ware crocks, and in these containers it usually becomes partly decomposed by the entrance of moisture. On the other hand, phosphorus trichloride is much less corrosive and may be shipped in lead-lined drums. By using the trichloride, chlorinating it to the pentachloride in the solvent in which the subsequent reaction is to take place, the pentachloride is obtained in a very pure state, free from decomposition products formed by the absorption of moisture. This also saves the expensive packages necessary for the pentachloride and greatly reduces the cost of products prepared from hydroxy compounds.

As many apparently widely different embodiments of this invention may be made without departing from the spirit and scope thereof, it is to be understood that I do not limit myself to the specific embodiments thereof except as defined in the following claims.

I claim:

1. The process which comprises reacting chlorine with phosphorus trichloride in an inert normally liquid high boiling aromatic solvent of the class consisting of nitrobenzene and dichlorobenzene, the amount of chlorine being sufficient to produce a composition comprising phosphorus pentachloride and phosphorus trichloride.

2. A composition adapted to react with hydroxy compounds to produce phosphorus oxy-chloride and compounds in which the hydroxyl group is replaced by a chlorine atom, said composition comprising substantially phosphorus pentachloride, phosphorus trichloride and ortho-dichlorobenzene.

WILLIAM ROBERT WALDRON.